(12) United States Patent
Sezer et al.

(10) Patent No.: US 9,531,962 B2
(45) Date of Patent: Dec. 27, 2016

(54) IMAGE SET ALIGNMENT AND COMBINATION PROCESSING

(71) Applicant: Samsung Electronics Co., Ltd., Suwon-si, Gyeonggi-do (KR)

(72) Inventors: Osman G. Sezer, Plano, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/682,895

(22) Filed: Apr. 9, 2015

(65) Prior Publication Data

US 2016/0028967 A1    Jan. 28, 2016

Related U.S. Application Data

(60) Provisional application No. 62/028,460, filed on Jul. 24, 2014, provisional application No. 62/028,499, filed on Jul. 24, 2014.

(51) Int. Cl.

| | |
|---|---|
| *G06K 9/32* | (2006.01) |
| *H04N 5/262* | (2006.01) |
| *G06T 7/00* | (2006.01) |
| *H04N 5/232* | (2006.01) |
| *H04N 5/265* | (2006.01) |
| *H04N 5/235* | (2006.01) |
| *G06T 3/40* | (2006.01) |

(52) U.S. Cl.
CPC .......... *H04N 5/2628* (2013.01); *G06T 3/4038* (2013.01); *G06T 7/003* (2013.01); *G06T 7/0028* (2013.01); *H04N 5/2355* (2013.01); *H04N 5/23229* (2013.01); *H04N 5/23267* (2013.01); *H04N 5/23296* (2013.01); *H04N 5/265* (2013.01); *H04N 5/2625* (2013.01); *G06T 2207/10016* (2013.01); *G06T 2207/10024* (2013.01); *G06T 2207/20221* (2013.01)

(58) Field of Classification Search
USPC ....... 382/294, 282, 162, 165, 124, 255, 305; 1/1; 348/240.2; 358/517, 537; 375/240.08; 455/556.1
See application file for complete search history.

(56) References Cited

U.S. PATENT DOCUMENTS 7,577,312 B2 * 8/2009 Sandrew ............... G06T 7/0036
                                                             358/517
8,369,399 B2 * 2/2013 Egnal ..................... G01C 11/02
                                                             375/240.08

* cited by examiner

*Primary Examiner* — Anh Do

(57) ABSTRACT

A method includes identifying feature points in an image in images generated of a scene by a camera and identifying locations of the identified feature points in remaining images in the images. The method also includes selecting a group of the identified feature points indicative of relative motion of the camera between image captures and aligning a set of the images using the selected group of feature points. The method may further include selecting a reference image from the set of aligned images, weighting other images the set, and combining the reference image with the weighted images. Weighting of the other images may include, for each other image in the set, comparing the other image and the reference image to identify one or more moving objects in the other image and applying a weight to pixel locations in the other image.

25 Claims, 8 Drawing Sheets

IMAGE SET ALIGNMENT AND COMBINATION PROCESSING

CROSS-REFERENCE TO RELATED APPLICATION(S) AND CLAIM OF PRIORITY

The present application claims priority to U.S. Provisional Patent Application Ser. No. 62/028,460, filed Jul. 24, 2014, entitled "AN APPARATUS/METHOD/SYSTEM TO COMBINE MULTIPLE IMAGES TO GENERATE ARTIFACT FREE HIGH QUALITY IMAGE". The present application also claims priority to U.S. Provisional Patent Application Ser. No. 62/028,499, filed Jul. 24, 2014, entitled "A MULTI-FRAME REGISTRATION SYSTEM FOR ALIGNING AND BLENDING IMAGE CAPTURES". The content of the above-identified patent documents is incorporated herein by reference.

TECHNICAL FIELD

This disclosure relates generally to image processing. More specifically, this disclosure relates to image set alignment and combination processing.

BACKGROUND

Resolution of images captured by cameras is determined mainly by optical factors and number of pixels on the imaging sensor chip. One common way to get a closer view of an object by a camera is to use optical zoom, where the lens of the camera in front of the imaging sensor is moved to change the magnification of the image. Due to higher costs, larger physical dimensions, and form factor demands, optical zooms are generally not utilized in mobile devices, such as smartphones and tablets. As a result, digital enhancement methods, such as digital zoom, are typically employed to improve object visibility details. Digital zoom technology mainly relies on single frame interpolation techniques. These techniques give users a sense of magnification, yet the actual image resolution remains the same. As a result, objects in the images become larger but their details are not improved, which creates pixilated and unclear image results.

In mobile photography, multiple frame technologies improve the resulting quality of captured photographs allowing improved signal-to-noise ratio and enhanced detail, which allows for a high quality digital zoom. Capturing the same scene multiple times within a short time period gives more information that can be used to render a final output frame. When capturing multiple frames with a mobile camera, movement of the camera creates misalignment between captured image frames. Additionally, objects may move while the multiple frames are captured causing a blur of duplicate objects in the final output frame (also known as ghosting). Due to very complex nature of possible motions that can be observed in an unrestricted scene, motion estimation frameworks often fail and produce noticeable artifacts in the resultant image.

SUMMARY

Embodiments of the present disclosure provide image set alignment and combination processing.

In one exemplary embodiment, a method for aligning and combining images is provided. The method includes identifying a plurality of feature points in an image in a plurality of images generated of a scene by a camera and identifying locations of the identified feature points in remaining images in the plurality of images. The method also includes selecting a group of the identified feature points indicative of relative motion of the camera between image captures and aligning a set of the plurality of images using the selected group of feature points. The method may further include selecting a reference image from the set of aligned images, weighting other images the set and combining the reference image with the weighted images. Weighting of the other images may include, for each other image in the set, comparing the other image and the reference image to identify one or more moving objects in the other image relative to the reference image and applying a weight to a plurality of pixel locations in the other image. A value of the weight for a pixel location may decrease based on an amount of relative movement of an object formed by the pixel location.

In another exemplary embodiment, a method for aligning images is provided. The method includes identifying a plurality of feature points in a reference image in a set of images generated of a scene by a camera and identifying locations of the identified feature points in remaining images in the set of images. The method also includes selecting a group of the identified feature points indicative of relative motion of the camera between image captures and aligning at least one of the remaining images with the reference image using the selected group of feature points.

In yet another exemplary embodiment, a method for combining images is provided. The method includes selecting a reference image from a set of images generated of a scene by a camera and weighting other images the set. Weighting of the other images includes, for each other image in the set, comparing the other image and the reference image to identify one or more moving objects in the other image relative to the reference image and applying a weight to a plurality of pixel locations in the other image. A value of the weight for a pixel location decreases based on an amount of relative movement of an object formed by the pixel location. Additionally, the method includes combine the reference image with the weighted images.

In still yet another exemplary embodiment, an apparatus for aligning images is provided. The apparatus includes a memory and a controller. The memory is configured to at least temporarily store a set of images generated of a scene by a camera. The controller is configured to identify a plurality of feature points in a reference image in the set of images, identify locations of the identified feature points in remaining images in the set of images, select a group of the identified feature points indicative of relative motion of the camera between image captures, and align at least one of the remaining images with the reference image using the selected group of feature points.

In yet another exemplary embodiment, an apparatus for combining images is provided. The apparatus includes a memory and a controller. The memory is configured to at least temporarily store a set of images generated of a scene by a camera. The controller is configured to select a reference image from the set of images; weight other images the set by, for each other image, comparing the other image and the reference image to identify one or more moving objects in the other image relative to the reference image and applying a weight to a plurality of pixel locations in the other image, a value of the weight for a pixel location decreasing based on an amount of relative movement of an object formed by the pixel location; and combine the reference image with the weighted images.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
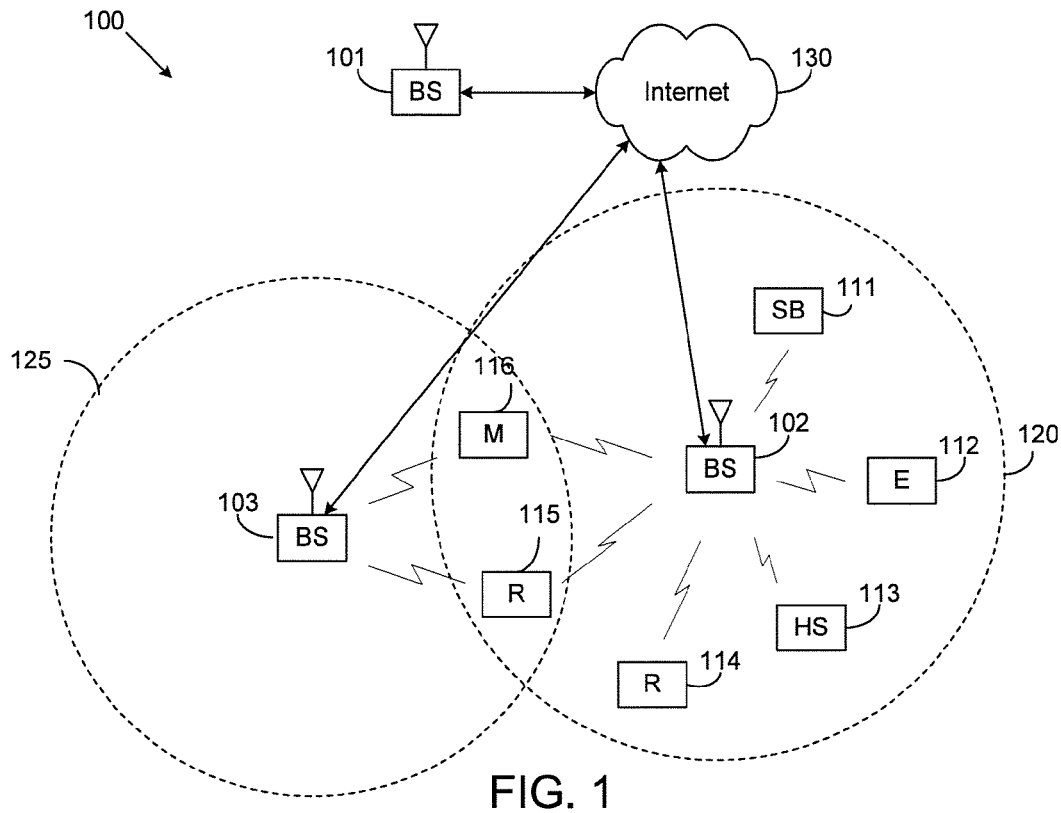
FIG. 1 illustrates an example wireless communication system according to illustrative embodiments of this disclosure.

FIG. 1 illustrates exemplary wireless communication system 100 in which embodiments of the present disclosure may be implemented. In the illustrated embodiment, wireless communication system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, images, video, video conferencing, and/or other broadband services via Internet 130. In an exemplary embodiment, one or more of user equipment 111-116 may be associated with an access point (AP) of a WiFi WLAN. User equipment 111-116 may be any of a number of other mobile devices, including a wireless-enabled camera, laptop computer, a tablet, personal data assistant, notebook, handheld device, or other wireless-enabled device. User equipment 114 and 115 may be, for example, a wireless-enabled personal computer (PC), a laptop computer, a gateway, or another device.

Figure 2:
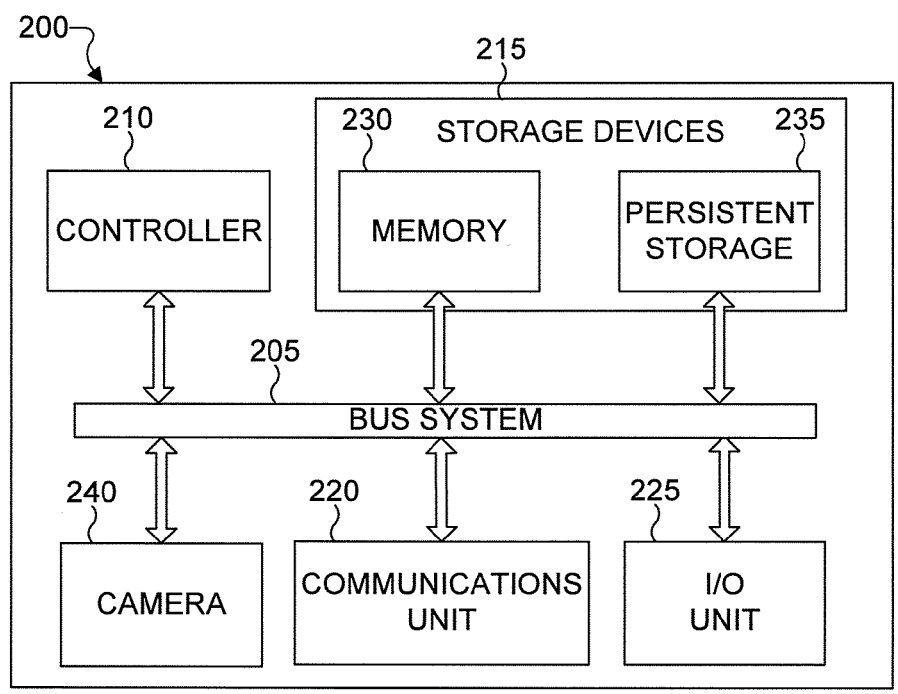
FIG. 2 illustrates a block diagram of an example image processing device according to this disclosure.

FIG. 2 illustrates a block diagram of an example image processing device 200 according to this disclosure. The image processing device 200 may represent one or more of the UEs 111-116 in FIG. 1. For example, image processing device 200 may be a smartphone having a digital camera.

As shown in FIG. 2, the device 200 includes a bus system 205, which supports communication between at least one controller 210, at least one storage device 215, at least one communications unit 220, at least one input/output (I/O) unit 225, and at least one camera 240.

The controller 210 executes instructions that may be loaded into a memory 230. The controller 210 may include any suitable number(s) and type(s) of processor or other device in any suitable arrangement. Example types of controllers 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, an optical disc, a removable Secure Digital (SD) card, etc.

The communications unit 220 supports communications with other systems or devices. For example, the communications unit 220 could include a network interface card, a transmitter, a receiver, or a wireless (e.g., WiFi, cellular, etc.) transceiver facilitating communications over the network 130. The communications unit 220 may support communications through any suitable physical or wireless communication link(s).

The I/O unit 225 allows for input and output of data. For example, the I/O unit 225 may provide a connection to another device via a connection (e.g., uniform serial bus (USB) or other connector). The I/O unit 225 may also include a touch screen display for displaying captured images and receiving user inputs.

The camera 240 includes image processing hardware for generating an image including, for example, one or more lens, shutter mechanisms, optical sensors, memory, image processing circuitry, etc. For example, the camera 240 may include a processor for image set alignment and combination processing in accordance with the illustrative embodiments of the present disclosure. Additionally or alternatively, controller 210 may perform the image set alignment and combination processing in accordance with the illustrative embodiments of the present disclosure.

Although FIG. 2 illustrates an example image processing device 200, various changes may be made to FIG. 2. For example, various components in FIG. 2 could be combined, further subdivided, or omitted, and additional components could be added according to particular needs. As a particular example, the image processing device 200 may not include the camera 240 and may be a stand-alone image processing device that receives images generated by a discrete camera. In another example, controller 210 could be divided into multiple processors, such as one or more central processing units (CPUs) and one or more graphics processing units (GPUs).

Embodiments of the present disclosure recognize that images captured over a short period of time (e.g., a photo burst) can have misalignment due to motion of the camera during the capture sequence. Registration of the image frames from the sequence is performed to align the images to allow for combining of information across frames to achieve noise reduction and detail enhancement. Embodiments of the present disclosure also recognize that movement of objects in the scene are independent of camera motion and serve as poor candidates for feature points used for alignment. Accordingly, embodiments of the present disclosure provide systems and methods for aligning multiple images to account for camera motion while reducing or minimizing the effect of moving objects during the alignment process.

Figure 3:
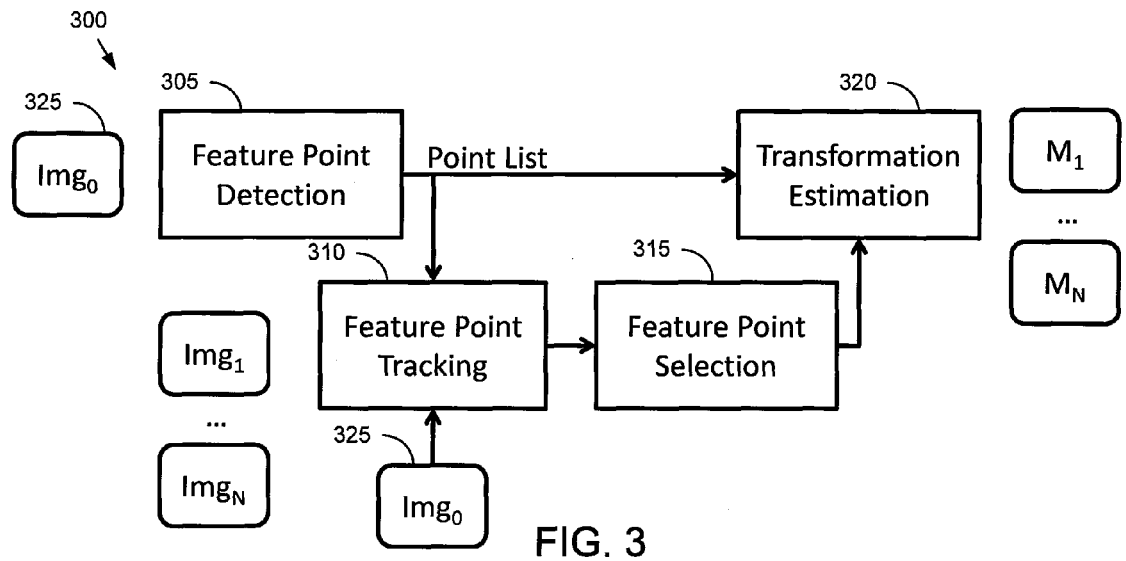
FIG. 3 illustrates a block diagram of an image frame registration system according to illustrative embodiments of this disclosure.

FIG. 3 illustrates a block diagram of an image frame registration system 300 according to illustrative embodiments of this disclosure. For example, system 300 may be implemented by the image processing device 200 in FIG. 2 to register images for combination. System 300 includes four primary components: feature point detection block 305, feature point tracking block 310, feature point selection block 315, and transformation estimation block 320.

In this illustrative embodiment, several key components are utilized by the system 300 to compute the best alignment between a currently processed image frame and a reference image ($Img_0$) 325 from the captured sequence. The system 300 may select the reference image 325 from the sequence of images ($Img_{0-N}$). For example, the reference image 325 may be the first image, the last image, a randomly selected image, an image with better noise, sharpness, photometric alignment, etc. from the sequence of images.

Figure 4A:
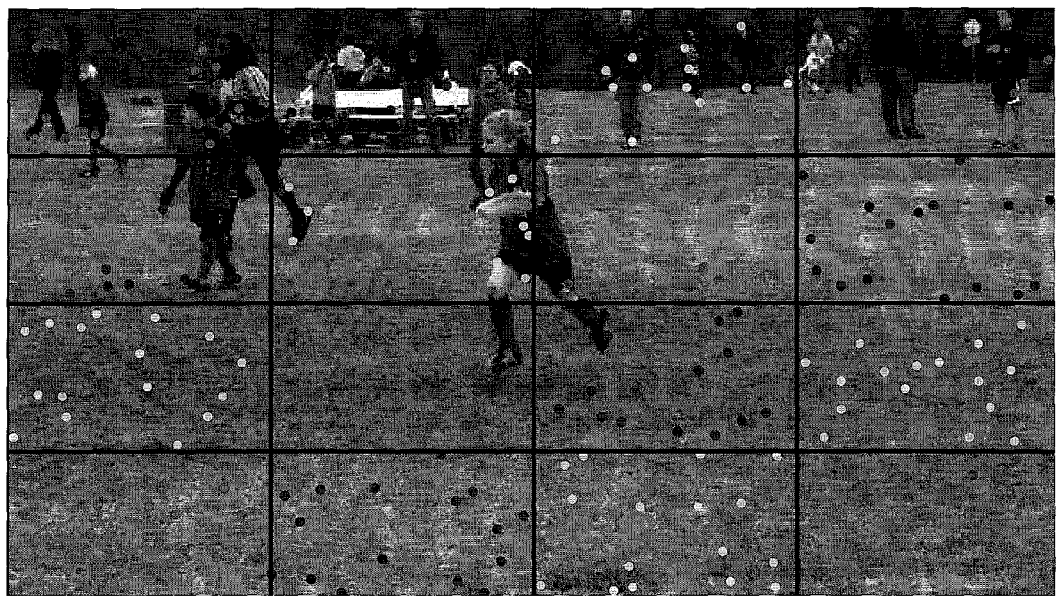
FIGS. 4A and 4B illustrate example images for feature point selection according to illustrative embodiments of this disclosure.

The system 300 then performs feature point detection (305) to identify key feature points in the scene using the reference image 325. In particular, the system 300 looks for points in the reference image 325 that may be easily located in other frames within the capture set. For example, the system 300 may identify uniquely identifiable feature points having a strong gradient in multiple directions, such as, for example, a feature point at a corner of different surfaces or image colors, and may avoid points in the reference image 325 having a weak gradient or a strong gradient in only one direction. The system 300 may divide or segment the reference image 325 into multiple regions and perform feature point detection independently on each region of the image to ensure that feature points cover the entire frame. For example, as illustrated in FIG. 4A, the system 300 may divide or segment the reference image 325 into 16 regions and select multiple feature points in each of the regions. In this example, the feature points selected may be along the edges or corners of objects, such as people, benches, trees, grass, signs, etc.

Figure 4B:

The system 300 then performs feature point tracking (310) to locate and track each of these identified feature points in successive images of $Img_1$ to $Img_N$. Feature point tracking allows the system 300 to identify how these key points have moved between successive frame captures and provide path data for the motion of the feature points. For example, as illustrated in FIG. 4B, the system 300 may track the feature points of each region along successive image frame captures relative to the reference image.

The system 300 then performs feature point selection (315) to select certain of the originally identified feature points to use for image alignment. For example, the system 300 may process movement of the feature points over the image sequence to identify feature points that are indicative of global camera movement throughout the image capture sequence and avoid feature points that are indicative of object movement in the scene. In particular, the system 300 may estimate a transformation (e.g., an affine matrix transformation) of the feature points between images to classify the movement between the images. For example, during the capture sequence, the camera may move towards or away from the scene, rotate, move up or down. Each of these motions can be accounted for using an affine matrix transformation (e.g., linear translation for up/down or left/right movements, scaling for moving towards/away movements, and/or rotational affine transformations for camera rotation. Random sample consensus (RANSAC) or other outlier removal techniques may be used to identify a subset of feature points that provide a reliable estimate of the affine matrix.

For example, the system 300 may perform affine matrix transformation estimation for each region in the compared images using a group of feature points present in the region. The system 300 then tests whether groups of feature points are a good fit for an affine transformation, for example, whether the groups are capable of being used to generate an affine transformation of small error or error below a defined threshold. Groups that cover a moving object will have large error across the sequence of images, indicating that the motion of the object is not well estimated by an affine transformation. This assumption holds when the object motion also involves deformation of the moving object (e.g., a human walking). The assumption also holds when the points in the group only partially cover the moving object. In this case, some points are static on the background features and some are moving with the object. Local affine transformations in the region do not fit this type of movement well, and the estimation error will be large.

When a group has a large estimation error or error over a threshold, the system 300 removes the group from the set of points that are later used to estimate the global affine transformation for ultimate image alignment. After the groups from all the different regions are analyzed, the system 300 selects only the groups that fit within a defined level of error for a local affine transformation. For example, as illustrated in FIG. 4B, feature points on moving persons have a large error in affine transformation estimation across the image sequence and, given the independence of the movement of the object from the movement of the camera over the sequence, are poorly suited for image alignment. On the other hand, feature points on static objects, such as grass, have a small error in affine transformation estimation across the image sequence and are more suitable for indicating camera movement across the sequence.

Figure 5A:
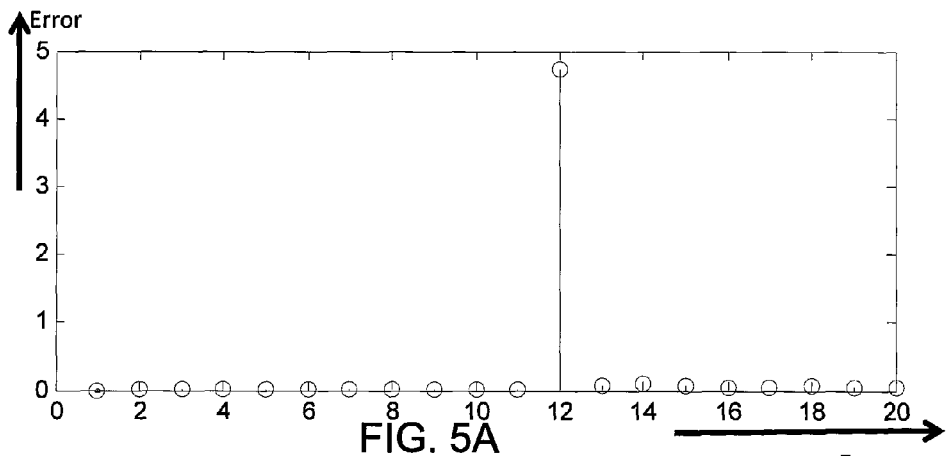
FIGS. 5A and 5B illustrate example graphs of affine error over a 20 frame sequence according to illustrative embodiments of this disclosure.
Figure 5B:
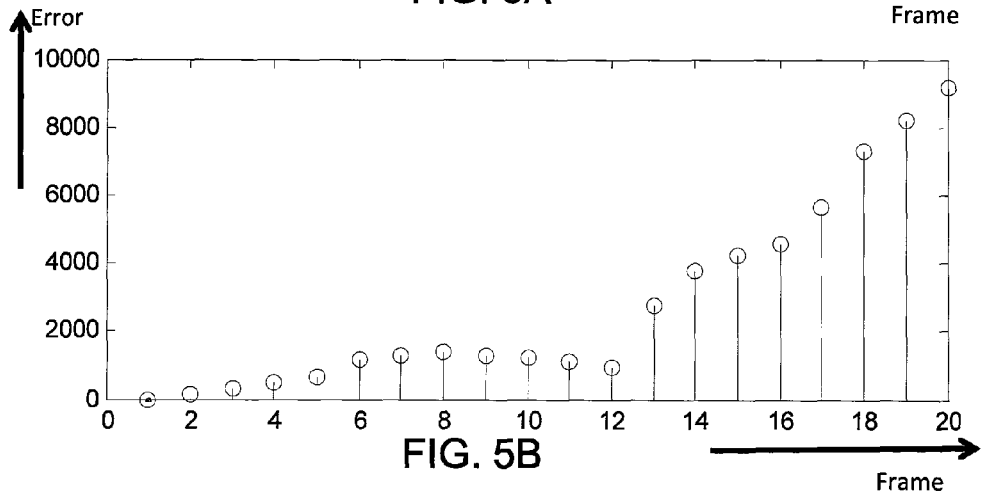

Further, the system 300 analyzes the regions over time. This enables the system 300 to select regions in the frames with reduced or small error and remove region(s) when the accumulated error across frames reaches a threshold. For example, as illustrated in FIGS. 5A and 5B, error in estimation of the affine transformation is shown for a sequence of 20 images. In particular, FIG. 5B may represent use of feature points on a moving object that is relatively still for the first 12 frames and then begins more significant movement, such as a person moving or the wind blowing an object. The error for this region over time exceeds the error threshold and consequently will not be selected for image alignment.

Additionally, the system 300 may perform image selection to remove images that are not suitable for alignment and combination. For example, if the camera re-focuses mid sequence or lighting conditions change dramatically, images generated during such events may be out of focus, blurry, over exposed, or otherwise unsuitable for alignment and combination. Using the same affine transformation estimation error techniques described above, the system 300 can easily identify such images as they will have high affine transformation error for multiple (if not all) regions of the image being tested. This example is illustrated in FIG. 4A in which frame 12 has a high error while no such high error exists in the other frames. As a result, the system 300 will remove that image from inclusion in the set of images that are aligned and ultimately combined to produce the detail increased image. This step may be a final filter the system 300 uses to measure the error of the global affine matrix and decide to use or reject the entire image.

Further, the system 300 performs a global affine transformation estimation (320) for the remaining set of images using the selected feature points to compute a compute affine alignment matrices, $M_1$ to $M_N$, to warp, zoom, rotate, move, and/or shift each of the images $Img_1$ to $Img_N$ to align with $Img_0$. In particular, the transformation estimation corrects alignment errors to register the images for combination by accounting for global movement of the camera across the sequence of images while ignoring independent movement of objects in the scene. The system 300 provides a single image capture of a scene, using multi-frame capture and blending to enhance the quality of the output provided to the user. Additionally, the system 300 enforces selection of feature points to cover the entire image and/or different regions of the image to improve the estimation of camera motion. For example, if only points from a small clustered region of the image were selected, error in transformation estimation would increase as the distance from the selected region increases. As a result, the system 300 selects different regions of the scene to improve transformation estimation error.

Embodiments of the present disclosure recognize that combination of a sequence of images, including objects moving in the scene, can result in motion artifacts, such as blurring or ghosting, in the resultant image. Embodiments of the present disclosure enable significantly improvement in quality of experience for a digital camera—particularly for enhanced zoom (e.g., high fidelity (HiFi) zoom) into parts of the scene during or after the capture. Embodiments of the present disclosure enable seamless fusion of multiple frames to form a single image (or a sequence of frame for video data) with improved resolution and reduced noise levels. In particular, embodiments of the present disclosure intelligently fuse (e.g., "SmartFusion") together multiple images for improved image detail while accounting for motion artifacts and providing dynamic range enhancement in color images.

Figure 6A:
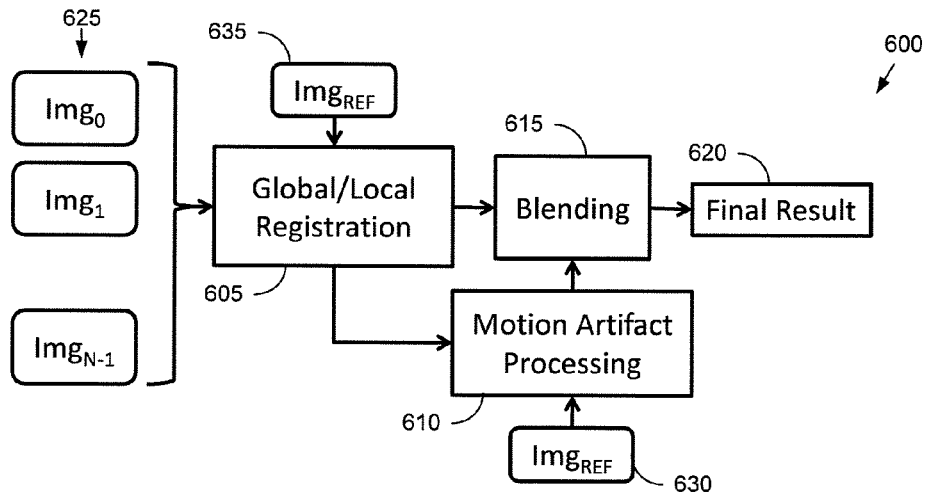
FIGS. 6A to 6F illustrate block diagrams of an image alignment and combination systems according to illustrative embodiments of this disclosure.
Figure 6B:
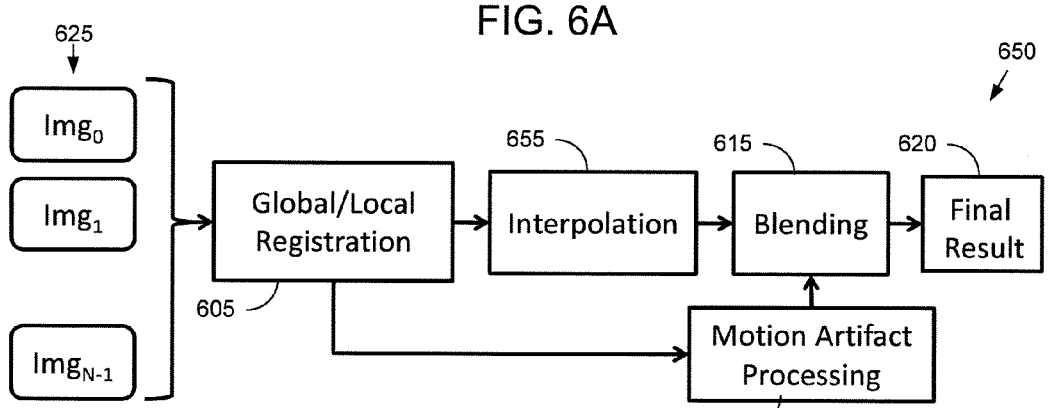
Figure 6C:
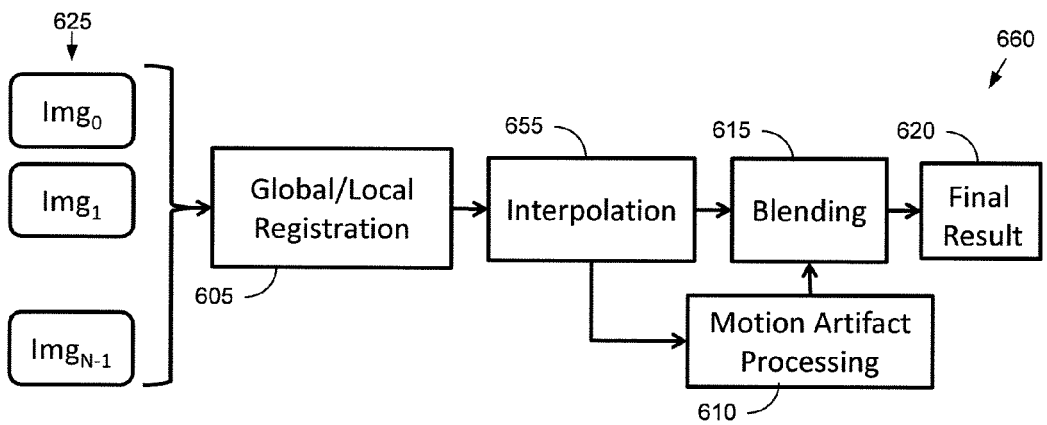
Figure 6D:
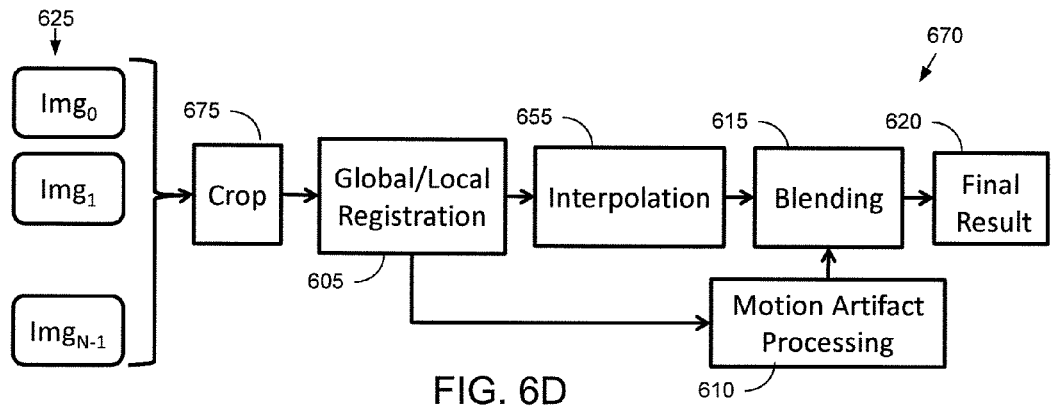
Figure 6E:
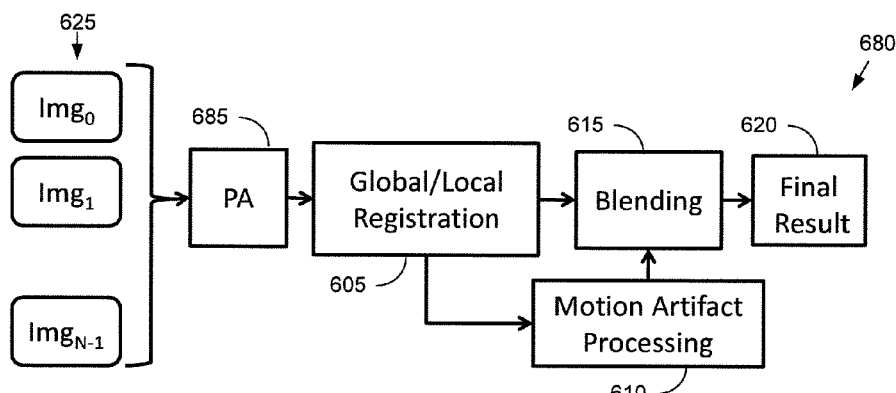
Figure 6F:
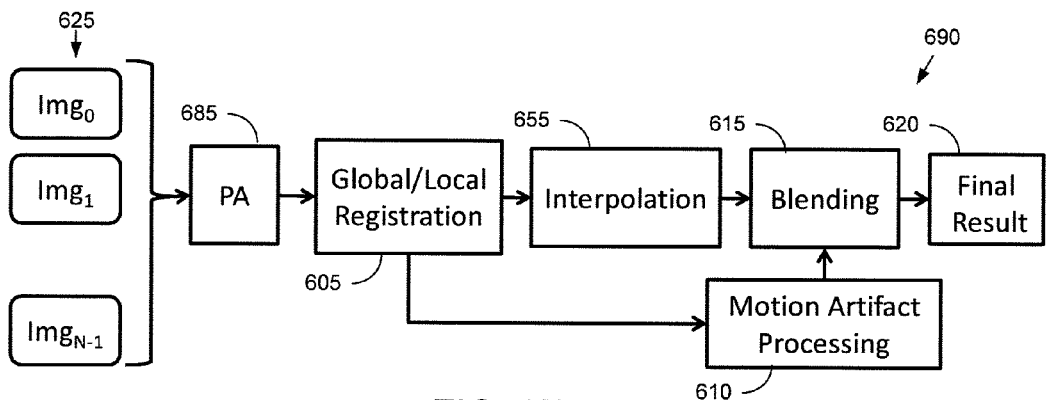

FIGS. 6A to 6F illustrate block diagrams of image alignment and combination systems according to illustrative embodiments of this disclosure. For example, the image alignment and combination systems may be implemented by the controller 210 in cooperation with the memory 230 of the image processing device 200 in FIG. 2. As illustrated in FIG. 6A, system 600 combines global/local registration 605 with motion artifact processing 610, for example, such as the image registration techniques as discussed above with regard to FIG. 3, to improve the blending 615 of images together to produce a final result 620 having improved image detail.

In these illustrative embodiments, the system 600 registers (605) a sequence of N image frames 625 for combination via alignment, for example, as discussed above. The system 600 performs motion artifact processing (610) to provide a blending weight (which will be discussed in greater detail below) for each pixel location based on a reference image 630 from the sequence 625. The system 600 may perform reference image frame selection prior to motion artifact processing (610), for example, via camera auto-focus statistics or some dedicated module, or a predetermined frame number could be assigned as the reference image 630. With an assumption that the weights are normalized to one (thus their sums are equal to one for each pixel position), after blending (615) the system 600 generates a final result (620).

For example, for image registration similar as described above, the system 600 may perform global registration to register each of the other frames in the sequence 625 to a reference image 635 (which may or may not be the same reference image 630 used in motion artifact image processing) by (i) extracting feature points on the reference image 635 and test image and locating feature points that exist both in reference and test images; (ii) using matching feature points calculate affine or perspective transform between two image frames and using outlier detectors to eliminate moving objects and incorrect matches; and (iii) warp pixels from the test image onto a reference pixel grid of the reference image 635 via interpolation. If utilizing local registration, the system 600 may register each of the other frames in the sequence 625 to the reference image 635 by (i) using optical flow or hierarchical motion estimation algorithms to find a motion vector of each pixel in reference image 635; and (ii) warping the test image onto a reference pixel grid using motion vectors.

After motion artifact processing (610) based on the reference image 630 (discussed in greater detail below), the system 600 produces a weighted sum of the registered images and blends (615) the images together by (i) multiplying an input frame with a weight matrix and accumulate the product; (ii) accumulating weights if they are not already normalized; (iii) and normalizing the accumulated product with the accumulated weights and generating a blended frame as the final result (620). The final resultant image may be stored as a single image having increased detail or may be generated upon request (for example, a request to zoom into an area of the reference image).

As illustrated in FIGS. 6B to 6F, additional elements may be included into the system 600. For example, system 650 includes interpolation 655 between registered images for resolution enhancement and multi-frame noise filtering. System 660 provides the output of the interpolation 655 into the motion artifact processing 610. System 670 provides computational efficiency by cropping 675 the images 625, for example, by removing areas outside of a zoomed-in area of interest. System 680 provides multi-frame high dynamic range imaging and noise filtering through the use of photometric alignment (PA) 685. System 690 includes both PA 685 and interpolation 655 for multi-frame high dynamic range imaging and resolution enhancement.

FIGS. 7A to 7D illustrate block diagrams of motion artifact processing systems according to illustrative embodiments of this disclosure. For example, the motion artifact processing systems 700, 750, 760, and 770 may be example implementations of the motion artifact processing block 610 in FIGS. 6A to 6F.

According to one illustrative embodiment, the system 700 provides selective fusion of images by generating weights for pixel locations present in the images after image alignment. The system 700 selects a reference image ($Img_{REF}$) 705 among multiple images registered from the sequence of images. The system 700 then compares similarities between the reference image 705 and a candidate image ($Img_i$) 710. The system 700 then, based on similarity, assigns a weight for the whole or a part of the region that was compared and repeats the similarity comparison and weighting for the entire image to accumulate local weights for the candidate image. The system 700 then multiplies the final accumulated weight with the candidate frame and accumulates global image weights for normalization of the weights. The system 700 then repeats the comparison, weighting, and accumulation for all candidate images registered in the sequence of images and normalizes the output with the accumulated global image to produce a resultant image. As will be discussed in greater detail below, the system 700 weights the images based on motion of objects appearing in the candidate image as compared with the reference image. For example, pixel locations corresponding to objects moving in candidate images will receive less or potentially no weight in the final resultant image, thereby reducing or eliminating artifacts caused by motion in the resultant image while improving image quality through image combination.

Figures 7A, 7B:
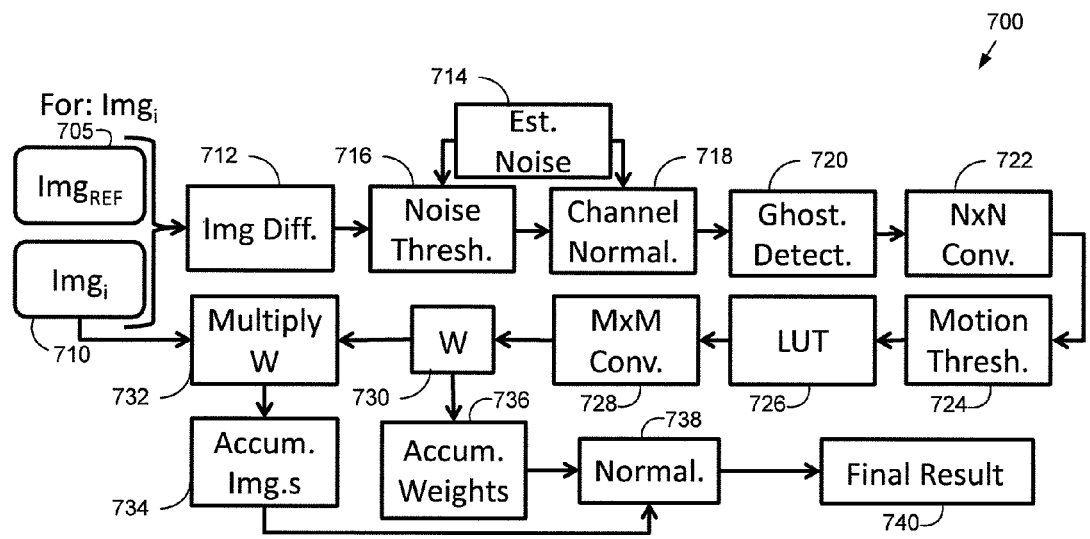
FIGS. 7A to 7D illustrate block diagrams of motion artifact processing systems according to illustrative embodiments of this disclosure.

In detail, for the example embodiment illustrated in FIG. 7A, the system 700 calculates the difference (712) between the reference image 705 and the candidate image 710 to generate a difference image. The system 700 measures noise levels (714) in the reference image 705 and candidate images 710. The system 700 then generates a noise threshold (716) for the difference image under which any differences between the reference image 705 and candidate image 710 is likely attributable to noise rather than motion and thus areas under the noise threshold may be considered static locations in the candidate image 710. The system 700 scales the scales color channels (718) of the difference image based on the noise levels and locates regions that are vulnerable to ghosting (720) to reduce fusion there by increasing the difference with a factor.

The system 700 then applies an N×N convolution (722) onto the resulting difference image and applies a motion threshold (724), above which objects represented by pixel locations in the image are considered to be in motion and given no or significantly reduced weight. The system 700 then assigns weight values for each pixel location using a look-up table (726). The motion threshold (724) and look-up table (726) may be combined, for example, as an exponential function that drastically reduces weight applied to pixel locations based on movement to a point after which no weight is applied. The system 700 then applies an M×M convolution (728) onto weight values to produce weights (730) for all the pixel locations in the candidate image. While the M×M or N×N convolutions may be implemented as box filters, they may also be implemented as row and column sums in a computationally efficient manner.

The system 700 then multiplies (732) the candidate image 710 by the weights for the pixel locations to produce a weighted image. The system 700 then repeats the above process for each remaining candidate image in the registered set of images and accumulates the weighted images (734) as well as the weights (736) for normalization (738). For example, the system may normalize the weight of each accumulated image to a value of one based on the applied and accumulated weights. The system 700 then combines the aligned and weighted images with the reference image 705 to produce a final result (740).

As illustrated in FIG. 7B, the system 750 further includes de-noising (755) of the reference image 705 that is accumulated with the aligned and weighted images. For example, since pixels of the moving object are likely only represented in the reference frame, de-noising the reference frame may reduce noise in the moving objects.

Figure 7C:
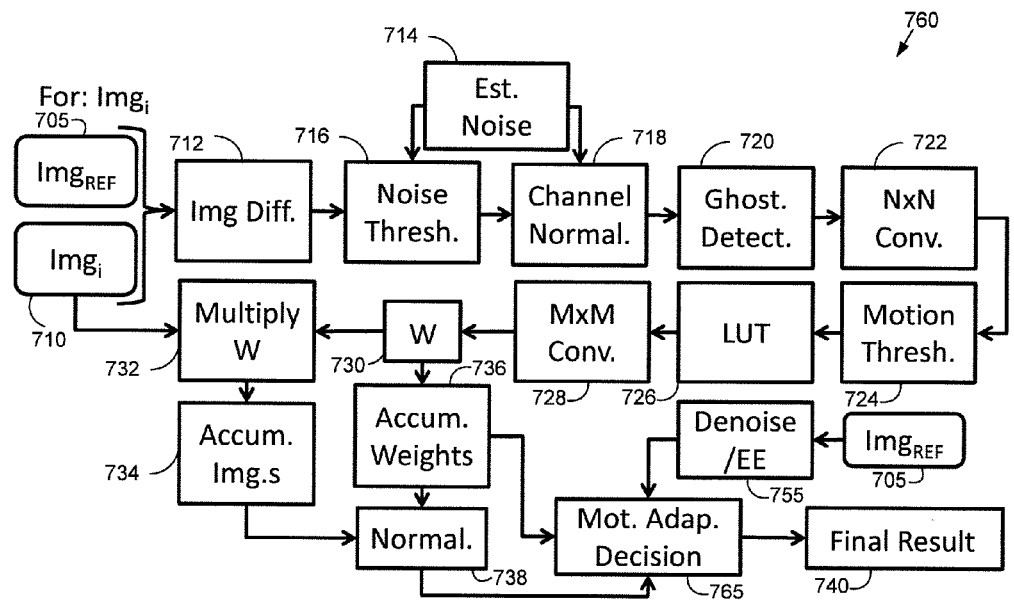

As illustrated in FIG. 7C, the system 760 further includes a motion adaptation decision block (765) whereby the system 760 identifies pixel locations in the reference image 705 that correspond to moving objects. For example, the system 760 may detect such pixel locations via the accumulated weight matrix (e.g., identifies locations where the weighting is zero or below the motion threshold). The system 760 selectively applies the de-noising (755) to only the locations in the reference image 705 that correspond to moving objects. This may provide additional improvements by not de-noising in static regions of the reference image and avoiding possible detail loss in such static regions.

Figure 7D:
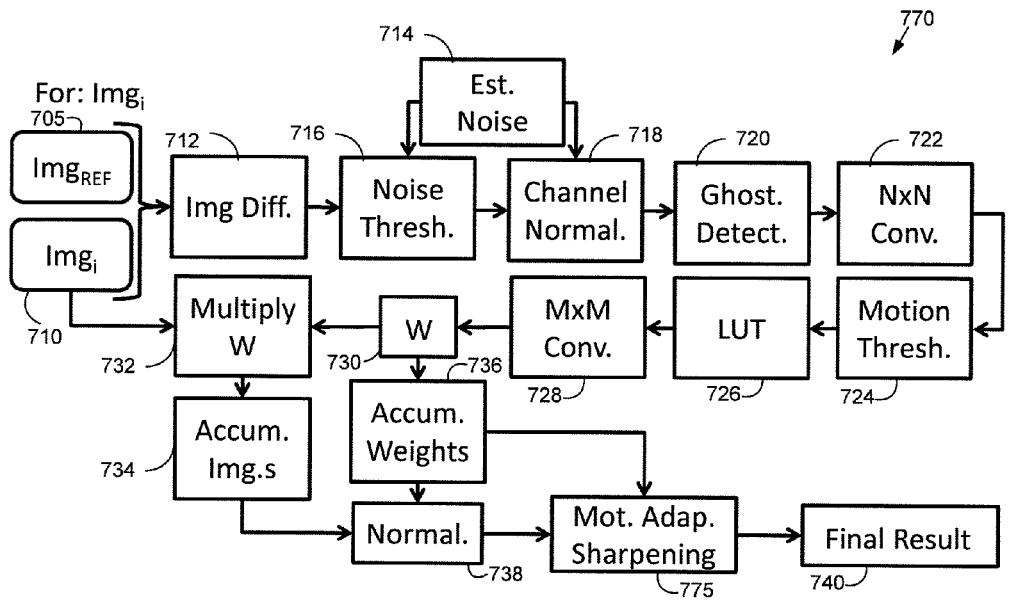

As illustrated in FIG. 7D, the system 770 further includes motion adaptive sharpening (775) whereby the system 770 reduces or eliminates sharpening levels in pixel locations corresponding to the moving object as compared to the rest of the image in the final result. For example, as discussed above, the system 770 may identify such pixel locations via the accumulated weight matrix.

Figure 8A:
FIGS. 8A to 8D illustrate an example of image combination with motion artifact processing according to illustrative embodiments of this disclosure.
Figure 8B:
Figure 8C:
Figure 8D:

FIGS. 8A to 8D illustrate an example of image combination with motion artifact processing according to illustrative embodiments of this disclosure. As illustrated in FIGS. 8A to 8C, three images of the same scene are generated over a short period of time. The background area of the image remains relatively constant while an object in the foreground (e.g., a bird) moves throughout the image sequence. Combining these three images without motion artifact processing would result in an image with ghosting of the object across the resultant image. However, utilizing the combination techniques described herein, the three noisy images with subject motion are combined to create a resultant image illustrated in FIG. 8D which has reduced noise and improved resolution, while reducing or eliminating motion artifacts through the selection of the image in FIG. 8B as the reference image and the motion artifact processing disclosed herein.

Although FIGS. 3, 6A to 6F, and 7A to 7D illustrate examples of block diagrams for systems for image registration, alignment, and/or combination, various changes could be made to FIGS. 3, 6A to 6F, and 7A to 7D. For example, while shown as a series of blocks, various blocks in each figure could overlap, be implemented in parallel, be implemented in a different order, be implemented multiple times, or removed.

Embodiments of the present disclosure provide advantages over implementations of the standard image registration system, particularly in situations where moving objects are present. By providing feature point selection, embodiments of the present disclosure can ignore object motion within the scene and accurately generate alignment matrices to globally align image frames. Moreover, during image combination, embodiments of the present disclosure provide motion artifact processing to produce a better quality result and combined image with higher details and elimination or reduction in motion artifacts, thus enabling greater detail in digital zooming.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for aligning and combining images, the method comprising:
   identifying a plurality of feature points in an image in a plurality of images generated of a scene by a camera;
   identifying locations of the identified feature points in remaining images in the plurality of images;
   selecting a group of the identified feature points indicative of relative motion of the camera between image captures; and
   aligning a set of the plurality of images using the selected group of feature points;
   selecting a reference image from the set of aligned images;
   weighting other images the set by, for each other image in the set:
      comparing the other image and the reference image to identify one or more moving objects in the other image relative to the reference image; and
      applying a weight to a plurality of pixel locations in the other image, a value of the weight for a pixel location decreasing based on an amount of relative movement of an object formed by the pixel location; and
   combining the reference image with the weighted images.

2. A method for aligning images, the method comprising:
identifying a plurality of feature points in a reference image in a set of images generated of a scene by a camera;
identifying locations of the identified feature points in remaining images in the set of images;
selecting a group of the identified feature points indicative of relative motion of the camera between image captures; and
aligning at least one of the remaining images with the reference image using the selected group of feature points.

3. The method of claim 2, wherein aligning the at least one remaining image comprises:
estimating a global affine transformation between the at least one remaining image and the reference image using locations of the selected group of feature points in the at least one remaining image and the reference image, and
aligning the at least one remaining image with the reference image based on the estimated global affine transformation.

4. The method of claim 3, wherein aligning the at least one remaining image with the reference image further comprises warping one or more of the images by at least one of translating, scaling, and rotating to align the one or more images with the reference image.

5. The method of claim 2, wherein selecting the group of the identified feature points and aligning the at least one remaining image with the reference image comprises:
segmenting the reference image and the at least one remaining image into a plurality of regions;
for each of the regions, estimating a local affine transformation between locations of feature points in each of the images in the set;
identifying movement of objects among the images based on estimation error of the local affine transformation for each of the regions; and
using only feature points in the regions having a local affine transformation estimation error less than a threshold to estimate a global affine transformation across the set of images.

6. The method of claim 5, wherein selecting the group of the identified feature points and aligning the at least one remaining image with the reference image further comprises:
identifying a local affine transformation estimation error of each of the images in the set; and
using only feature points in the images having a local affine transformation estimation error less than a threshold to estimate the global affine transformation across the set of images.

7. The method of claim 2, wherein identifying the plurality of feature points in the reference image comprises identifying the points having a gradient exceeding a threshold in more than one direction.

8. A method for combining images, the method comprising:
selecting a reference image from a set of images generated of a scene by a camera;
weighting other images the set by, for each other image in the set:
comparing the other image and the reference image to identify one or more moving objects in the other image relative to the reference image; and
applying a weight to a plurality of pixel locations in the other image, a value of the weight for a pixel location decreasing based on an amount of relative movement of an object formed by the pixel location; and
combining the reference image with the weighted images.

9. The method of claim 8, wherein comparing the other image and the reference image and applying the weight comprises:
segmenting the reference image and the other image into a plurality of regions; and
for each of the regions:
comparing corresponding regions of the other image and the reference image; and
assigning a weight to a part or an entirety of the region based on similarities of the compared regions.

10. The method of claim 8, wherein comparing the other image and the reference image and applying the weight comprises:
calculating a difference image between the other image and the reference image;
applying a convolution to the difference image;
assigning weight values for each pixel location in the difference image; and
applying a convolution to the weight values.

11. The method of claim 8, wherein combining the reference image with the weighted images comprises removing noise in the reference image prior to combining the reference image with the weighted images.

12. The method of claim 8, wherein combining the reference image with the weighted images comprises:
identifying locations of one or more moving objects in the reference image based on a motion threshold and weights applied to the pixel locations in the weighted images; and
removing noise from the identified locations of one or more moving objects in the reference image.

13. The method of claim 8, wherein combining the reference image with the weighted images comprises:
identifying locations of one or more moving objects in the reference image based on a motion threshold and weights applied to the pixel locations in the weighted images; and
reducing image sharpening of the identified locations of one or more moving objects in the reference image.

14. An apparatus for aligning images, the apparatus comprising:
a memory configured to at least temporarily store a set of images generated of a scene by a camera; and
a controller configured to:
identify a plurality of feature points in a reference image in the set of images;
identify locations of the identified feature points in remaining images in the set of images;
select a group of the identified feature points indicative of relative motion of the camera between image captures; and
align at least one of the remaining images with the reference image using the selected group of feature points.

15. The apparatus of claim 14, wherein to align the at least one remaining image the controller is configured to:
estimate a global affine transformation between the at least one remaining image and the reference image using locations of the selected group of feature points in the at least one remaining image and the reference image, and
align the at least one remaining image with the reference image based on the estimated global affine transformation.

16. The apparatus of claim 15, wherein to align the at least one remaining image with the reference image the controller is further configured to warp one or more of the images by at least one of translating, scaling, and rotating to align the one or more images with the reference image.

17. The apparatus of claim 14, wherein to select the group of the identified feature points and align the at least one remaining image with the reference image the controller is configured to:
- segment the reference image and the at least one remaining image into a plurality of regions;
- for each of the regions, estimate a local affine transformation between locations of feature points in each of the images in the set;
- identify movement of objects among the images based on estimation error of the local affine transformation for each of the regions; and
- use only feature points in the regions having a local affine transformation estimation error less than a threshold to estimate a global affine transformation across the set of images.

18. The apparatus of claim 17, wherein to select the group of the identified feature points and align the at least one remaining image with the reference image the controller is further configured to:
- identify a local affine transformation estimation error of each of the images in the set; and
- use only feature points in the images having a local affine transformation estimation error less than a threshold to estimate the global affine transformation across the set of images.

19. The apparatus of claim 14, wherein to identify the plurality of feature points in the reference image the controller is configured to identify the points having a gradient exceeding a threshold in more than one direction.

20. An apparatus for combining images, the apparatus comprising:
- a memory configured to at least temporarily store a set of images generated of a scene by a camera; and
- a controller configured to:
    - select a reference image from the set of images;
    - weight other images the set by, for each other image:
        - comparing the other image and the reference image to identify one or more moving objects in the other image relative to the reference image; and
        - applying a weight to a plurality of pixel locations in the other image, a value of the weight for a pixel location decreasing based on an amount of relative movement of an object formed by the pixel location; and
    - combine the reference image with the weighted images.

21. The apparatus of claim 20, wherein to compare the other image and the reference image and apply the weight the controller is configured to:
- segmenting the reference image and the other image into a plurality of regions; and
- for each of the regions:
    - comparing corresponding regions of the other image and the reference image; and
    - assigning a weight to a part or an entirety of the region based on similarities of the compared regions.

22. The apparatus of claim 20, wherein to compare the other image and the reference image and apply the weight the controller is configured to:
- calculate a difference image between the other image and the reference image;
- apply a convolution to the difference image;
- assign weight values for each pixel location in the difference image; and
- apply a convolution to the weight values.

23. The apparatus of claim 20, wherein to combine the reference image with the weighted images the controller is configured to remove noise in the reference image prior to combining the reference image with the weighted images.

24. The apparatus of claim 20, wherein to combine the reference image with the weighted images the controller is configured to:
- identify locations of one or more moving objects in the reference image based on a motion threshold and weights applied to the pixel locations in the weighted images; and
- remove noise from the identified locations of one or more moving objects in the reference image.

25. The apparatus of claim 20, wherein to combine the reference image with the weighted images the controller is configured to:
- identify locations of one or more moving objects in the reference image based on a motion threshold and weights applied to the pixel locations in the weighted images; and
- reduce image sharpening of the identified locations of one or more moving objects in the reference image.

* * * * *